(12) United States Patent
Ahn

(10) Patent No.: US 8,619,763 B2
(45) Date of Patent: Dec. 31, 2013

(54) METHOD AND APPARATUS FOR STORING AND REPRODUCING INTERACTIVE SERVICE OF DIGITAL BROADCAST

(75) Inventor: Jin-yong Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 11/712,438

(22) Filed: Mar. 1, 2007

(65) Prior Publication Data

US 2008/0034399 A1    Feb. 7, 2008

(30) Foreign Application Priority Data

Aug. 7, 2006    (KR) .................. 10-2006-0074317

(51) Int. Cl.
| | | |
|---|---|---|
| *H04L 12/50* | (2006.01) | |
| *H04Q 11/00* | (2006.01) | |
| *H04N 5/93* | (2006.01) | |
| *H04N 5/783* | (2006.01) | |
| *H04N 5/917* | (2006.01) | |
| *H04N 7/173* | (2011.01) | |
| *H04N 7/16* | (2011.01) | |
| *H04N 21/434* | (2011.01) | |
| *H04N 21/432* | (2011.01) | |
| *H04N 21/433* | (2011.01) | |
| *H04N 5/76* | (2006.01) | |
| *H04N 5/92* | (2006.01) | |
| *H04H 60/25* | (2008.01) | |
| *H04H 60/27* | (2008.01) | |
| *H04H 60/29* | (2008.01) | |
| *G11B 27/00* | (2006.01) | |

(52) U.S. Cl.
CPC ....... *H04N 21/4345* (2013.01); *H04N 21/4341* (2013.01); *H04N 21/434* (2013.01); *H04N 21/432* (2013.01); *H04N 21/4334* (2013.01); *H04N 21/4325* (2013.01); *H04N 5/783* (2013.01); *H04N 5/76* (2013.01); *H04N 5/92* (2013.01); *H04N 5/9201* (2013.01); *H04H 60/25* (2013.01); *H04H 60/27* (2013.01); *H04H 60/29* (2013.01); *G11B 27/005* (2013.01)
USPC ........... 370/378; 370/377; 370/381; 386/343; 386/344; 386/353; 386/355; 386/356; 386/357; 725/134; 725/142

(58) Field of Classification Search
CPC ........... H04N 21/434; H04N 21/4341; H04N 21/4345; H04N 21/432; H04N 21/4334; H04N 21/4325; H04N 5/783; H04N 5/76; H04N 5/92; H04N 5/9201; G11B 27/005; H04H 60/25; H04H 60/27; H04H 60/29
USPC .......... 370/378, 377, 381; 386/343, 344, 353, 386/355, 356, 357; 725/134, 142
See application file for complete search history.

(56) References Cited

U.S. PATENT DOCUMENTS

| | | | |
|---|---|---|---|
| 7,188,353 B1 * | 3/2007 | Crinon ........................... 725/32 |
| 7,823,055 B2 | 10/2010 | Sull et al. |
| 8,091,104 B2 | 1/2012 | Ahn et al. |
| 2003/0043924 A1 * | 3/2003 | Haddad et al. ........... 375/240.28 |
| 2006/0193597 A1 * | 8/2006 | Horii et al. ....................... 386/46 |
| 2007/0008402 A1 | 1/2007 | Ahn et al. |
| 2007/0122112 A1 * | 5/2007 | Ando et al. ..................... 386/95 |
| 2007/0206932 A1 * | 9/2007 | Kato ............................. 386/111 |

FOREIGN PATENT DOCUMENTS

| | | | | |
|---|---|---|---|---|
| EP | 1206141 A2 * | 5/2002 | ............... H04N 9/82 |
| JP | 2001101190 A | 4/2001 | |
| KR | 1997-0073107 A | 11/1997 | |
| KR | 10-2000-0071480 A | 11/2000 | |
| KR | 1020040058458 A | 7/2004 | |
| KR | 1020050002681 A | 1/2005 | |
| KR | 1020050019417 A | 3/2005 | |
| KR | 10-2006-0099413 A | 9/2006 | |
| KR | 10-2006-0105910 A | 10/2006 | |
| KR | 10-2006-0124522 A | 12/2006 | |
| KR | 10-2007-0005441 A | 1/2007 | |
| KR | 10-2007-0061150 A | 6/2007 | |

| | | |
|---|---|---|
| WO | 03/107656 A1 | 12/2003 |
| WO | 2005/104557 A1 | 11/2005 |
| WO | 2005/104558 A1 | 11/2005 |

OTHER PUBLICATIONS

Extended European Search Report issued on Dec. 21, 2010 in the corresponding European Patent Application No. 07793242.4.
Communication, dated Jul. 24, 2007, issued by the Korean Intellectual Property Office in counterpart Korean Application No. 10-2006-0074317.

* cited by examiner

*Primary Examiner* — Ayaz Sheikh
*Assistant Examiner* — Tarell Hampton
(74) *Attorney, Agent, or Firm* — Sughrue Mion, PLLC

(57) ABSTRACT

A method, an apparatus, and an information recording medium for storing and reproducing an interactive service capable of efficiently storing and processing interactive signaling information are provided. The information recording medium has recorded thereon interactive signaling information of a digital broadcast and includes a first region storing information on a time when the interactive signaling information occurs, a second region storing a type of the interactive signaling information and identification information; and a third region storing signaling items of the interactive signaling information. In the method and apparatus, filtering and monitoring using hardware or software to acquire interactive signaling information on a service stream for reproducing an interactive service is unnecessary because the signaling information is separately stored.

12 Claims, 4 Drawing Sheets

METHOD AND APPARATUS FOR STORING AND REPRODUCING INTERACTIVE SERVICE OF DIGITAL BROADCAST

CROSS-REFERENCE TO RELATED PATENT APPLICATION

This application claims priority from Korean Patent Application No. 10-2006-0074317, filed on Aug. 7, 2006, in the Korean Intellectual Property Office, the disclosure of which is incorporated herein in its entirety by reference.

BACKGROUND OF THE INVENTION

1. Field of the Invention

The present invention relates to an interactive service of a digital broadcast, and more particularly, to a method and an apparatus for storing and reproducing an interactive service capable of efficiently storing and processing interactive signaling information.

2. Description of Related Art

Recently, digital broadcast receiving apparatuses including high-capacity recording media such as hard disks are being developed, announced in the market, and commercialized. The apparatus receives a broadcast program selected by a user and records the program on a hard disk. The digital broadcast receiving apparatus is expected to replace a conventional video cassette recorder (VCR) in a rapid manner as the digital broadcast service becomes widely used.

In the digital broadcast service, interactive services which can be interacted with by a user are provided. In order to provide the interactive services, interactive signaling information is continuously included and transmitted in a broadcast stream, considering that one of the characteristics of a broadcast service is that a user can turn on the service any time. Accordingly, when an interactive service is recorded in a conventional method, the interactive signaling information, which is mixed with the interactive service stream, is stored together with the interactive service stream. So, when the recorded interactive service is reproduced, there is a problem in that the load of an apparatus for reproduction is increased, since signal filtering and monitoring using hardware or software must inevitably be performed in order to acquire the interactive signaling information. In particular, when a trick play such as a reverse playback, a high-speed playback, a slow-speed playback, a search, and the like is performed in reproducing an interactive service, it is impossible to process the trick play reflecting an interactive element, since filtering, monitoring, and history-managing operations on the signaling information are difficult.

In addition, the same signaling information included and transmitted in an interactive service stream may be transmitted repeatedly. Accordingly, in a conventional method of storing the signaling information, there is a problem in that redundant information occupying unnecessary storage due to duplication of the same may exist.

SUMMARY OF THE INVENTION

Exemplary embodiments of the present invention provide a storage structure for storing interactive signaling information capable of efficiently utilizing a history of the signaling information in reproducing an interactive service.

Exemplary embodiments of the present invention also provide a method and an apparatus for storing an interactive service using the storage structure for storing the signaling information and a method and an apparatus for reproducing an interactive service without filtering and monitoring the signaling information.

According to an aspect of the present invention, there is provided an information recording medium having recorded thereon interactive signaling information of a digital broadcast, the interactive signaling information comprising: a first region storing information on a time when the interactive signaling information occurs; a second region storing a type and identification information of the interactive signaling information; and a third region storing signaling items of the interactive signaling information.

In the aspect above, the third region may comprise: information on a signaling item that has changed, which is determined by comparing the interactive signaling information with interactive signaling information that previously occurred and is the same type as the interactive signaling information that previously occurred; and identification information on the interactive signaling information that previously occurred.

In addition, the first region may comprise information on an occurrence time of the interactive signaling information based on at least one of an NPT (normal play time), a PCR/STC (program clock reference/system time clock), and a TDT/TOT (time and date table/time offset table).

According to another aspect of the present invention, there is provided an apparatus for storing an interactive service of a digital broadcast comprising: a signaling information acquisition unit extracting signaling information from an interactive service stream; a signaling information conversion unit converting the extracted signaling information into signaling information of a predetermined format; a synchronization unit generating information on an occurrence time of the extracted signaling information and adding the generated information on the occurrence time to the signaling information of the predetermined format; and a storage unit storing the synchronized signaling information of the predetermined format.

In the aspect above, the signaling information conversion unit may compare the extracted signaling information to previously stored signaling information of the predetermined format and convert changed information only into the signaling information of the predetermined format.

In addition, the signaling information conversion unit may generate the signaling information of the predetermined format including all signaling items for each type of the interactive signaling information when the type of the interactive signaling information occurs for the first time and generates the signaling information of the predetermined format including information on changed signaling items thereafter.

In addition, the synchronization unit may describe information on a time when the extracted signaling information occurs based on at least one of an NPT (normal play time), a PCR/STC (program clock reference/system time clock), and a TDT/TOT (time and date table/time offset table).

According to another aspect of the present invention, there is provided an apparatus for reproducing an interactive service of a digital broadcast, the apparatus comprising: a storage unit storing synchronized signaling information of a predetermined format separately from an interactive service stream; a retrieval unit reading the stored signaling information and the interactive service stream; and a signaling information processing unit, which when the interactive service stream is reproduced, references the read signaling information and processes a corresponding interactive event at every occurrence time of the signaling information.

In the aspect above, the signaling information processing unit may comprise: a time information extraction unit extracting information on a time when the signaling information occurs from the read signaling information; a timer setting unit setting a system timer using the extracted time information; and an event handling unit processing a corresponding interactive event using the read signaling information when an operation of the system timer is completed.

According to another aspect of the present invention, there is provided a method of storing an interactive service of a digital broadcast, the method comprising: extracting signaling information from an interactive service stream; converting the extracted signaling information into signaling information of a predetermined format; synchronizing the extracted signaling information by generating information on a time when the extracted signaling information occurs and adding the information on the time to the signaling information of the predetermined format; and storing the synchronized signaling information of the predetermined format.

According to another aspect of the present invention, there is provided a method of reproducing an interactive service of a digital broadcast, the method comprising: reading signaling information which is stored separately from an interactive service stream; and when the interactive service stream is reproduced, processing the read signaling information by referring to the read signaling information and processing a corresponding interactive event at every occurrence time of the signaling information.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Now, exemplary embodiments of the present invention will be described in detail with reference to the accompanying drawings.

Figure 1:
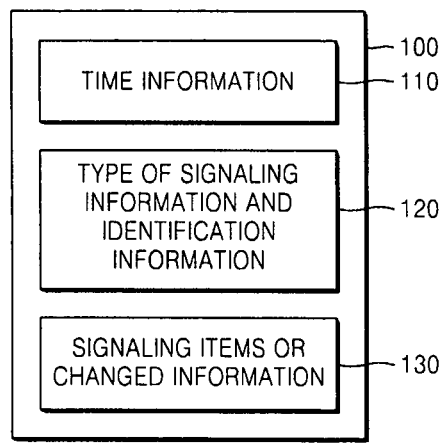
FIG. 1 is a storage structure for storing interactive signaling information according to an exemplary embodiment of the present invention.

FIG. 1 is a storage structure for storing interactive signaling information according to an embodiment of the present invention. In the present embodiment, when an interactive service stream is stored, the interactive signaling information in the stream is stored separately. Referring to FIG. 1, the signaling information is divided and stored in three regions 110, 120, and 130.

The first region 110 is used for storing information on a time when the interactive signaling information occurs. The information on the time may be information on a time when signaling occurs, which is calculated based on normal play time (NPT) information of an interactive service stream which is being stored. However, a reference time for calculation is not limited to the NPT, and a program clock reference/system time clock (PCR/STC) or a time and date table/time offset table (TDT/TOT) may be used as the reference time of the calculation. A type of time information used for calculating the signaling time is included in the information on the time. The information on the time is required for synchronization between the signaling and other elements in reproducing a stored interactive service.

The second region 120 is for storing information on the type of interactive signaling information and identification information. The type of the signaling information includes an application information table (AIT), etc. The third region 130 is for storing signaling items. The type of the signaling information and identification information, and information on the signaling items is information used for processing an interactive event in response to a corresponding signal. In the third region 130, it is more efficient to store changed items only, rather than storing all the signaling items. In this case, the signaling information is compared to previously occurred signaling information with respect to each type of the signaling information, and the changed signaling items and identification information on the previous signaling information which is used as a reference are stored. As is a case when all the items are stored, a reproducing apparatus can process a corresponding interactive event after the signaling information that actually occurred is restored using the reference signaling information and the changed information.

Figure 2:
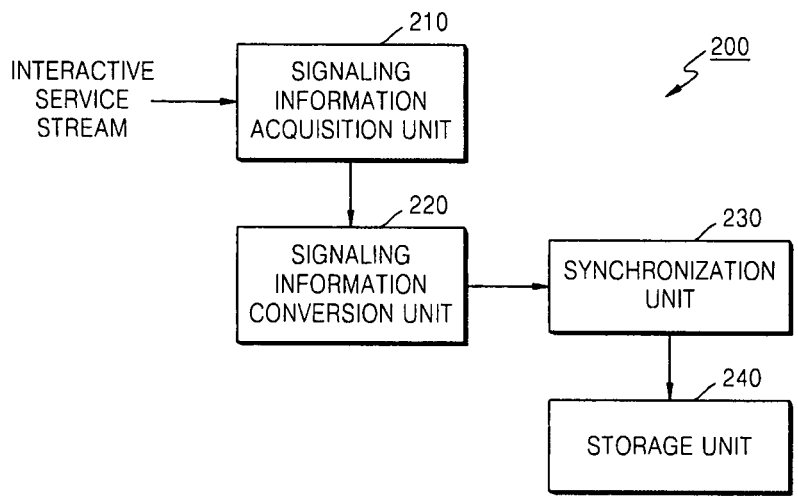
FIG. 2 is a block diagram illustrating an apparatus for storing an interactive service according to an exemplary embodiment of the present invention.

FIG. 2 is a block diagram illustrating an apparatus 200 for storing an interactive service according to an exemplary embodiment of the present invention.

Referring to FIG. 2, when a signaling information acquisition unit 210 senses signaling information in storing an interactive service stream, the signaling information acquisition unit 210 extracts signaling information from the interactive service stream. A signaling information conversion unit 220 issues identification information to the extracted signaling information, converts a type of the signaling information and signaling items into a predefined format as illustrated in FIG. 1, and records the converted information. And the signaling information conversion unit 220 leaves a time information field vacant. The synchronization unit 230 adds information on a time when the signaling information occurs so that the signaling information can be synchronized. In order to generate the information on the occurrence time, a current time may be calculated based on NPT information of the stream. The synchronization process is for synchronization between the signaling information and other elements of the interactive service being reproduced. The synchronized signaling information is stored in a storage unit 240.

As explained above, the signaling information stored in the storage unit 240 includes all the interactive signaling information that has occurred or only interactive signaling information that has changed compared to previous interactive signaling information. In order to store the changed interactive signaling information only, the signaling information conversion unit 220 records all the signaling items as the signaling information in the predetermined format when a type of interactive signaling information occurs for the first time. However, when the same type of signaling information occurs thereafter, the signaling information conversion unit 220 stores only changed signaling items together with an identification of the previous signaling information as the signaling information in the predetermined format. According to the procedures explained above, since an unnecessary signaling information item repeated in a broadcast stream is not stored, the amount of signaling information that is stored can be greatly decreased.

Figure 3:
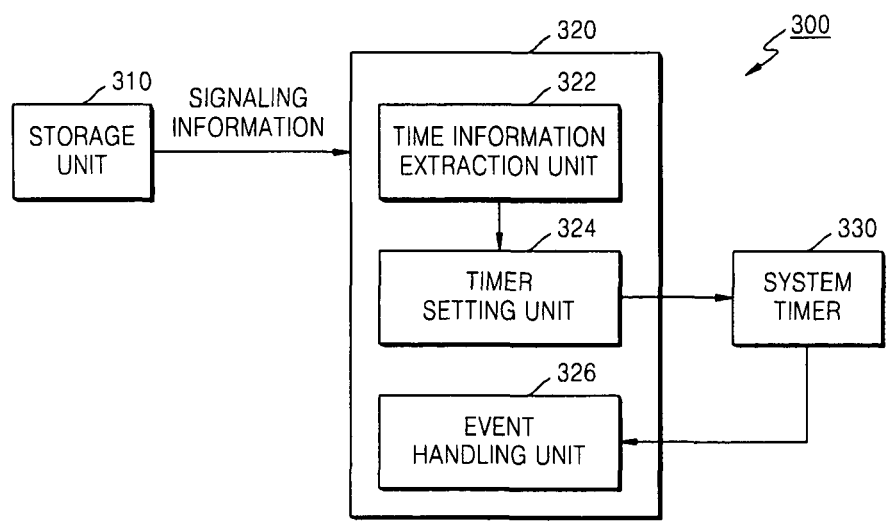
FIG. 3 is a block diagram illustrating an apparatus for reproducing an interactive service according to an exemplary embodiment of the present invention.

FIG. 3 is a block diagram illustrating an apparatus 300 for reproducing an interactive service according to an exemplary embodiment of the present invention. Elements of the apparatus 300 for reproducing an interactive service are similar to elements of apparatuses using conventional technology, except for elements that filter and monitor the signaling information, so only some elements for processing the interactive signaling information in the exemplary embodiment will be explained.

Referring to FIG. 3, in the storage unit 310, signaling information in a predetermined format which is stored separately from an interactive service stream is stored. The stored signaling information is synchronized, and the signaling information processing unit 320 processes an interactive event using a history of the separately stored signaling information. In other words, the signaling information processing unit 320 acquires an occurrence time of the signaling information by extracting time information included in the signaling information and processes a corresponding interactive event at every occurrence time of the signaling information. For example, when the signaling information is stored based on the NPT information, the stored signaling information is processed by setting and operating a system timer 330 using the NPT information.

In more detail, the signaling information processing unit 320 may include a time information extraction unit 322, a timer setting unit 324, and an event handling unit 326. The time information extraction unit 322 extracts time information from the signaling information, which is sequentially read and input from the storage unit 310, and transfers the time information to the timer setting unit 324. The timer setting unit 324 can obtain information from the time information on which type of reference time information is used and information on when the signaling information occurs, and sets a system timer 330 so as to complete an operation of the system timer 330 at a time when the signaling information occurs. The event handling unit 326 processes an interactive event corresponding to the signaling information currently to be processed when the operation of the system timer 330 set is completed, that is when a timer interrupt occurs.

According to an exemplary embodiment of the present invention, a history of the signaling information is separately stored, and so it is easy to reflect an interactive element when a trick play is performed in reproducing. For example, in a double-speed playback, events included in an interactive service can be processed and reproduced at a double speed only by setting a timer to operate at the double speed. In addition, in a reverse playback, interactive events can be easily reproduced in a reverse order by using the history of the signaling information.

Figure 4:
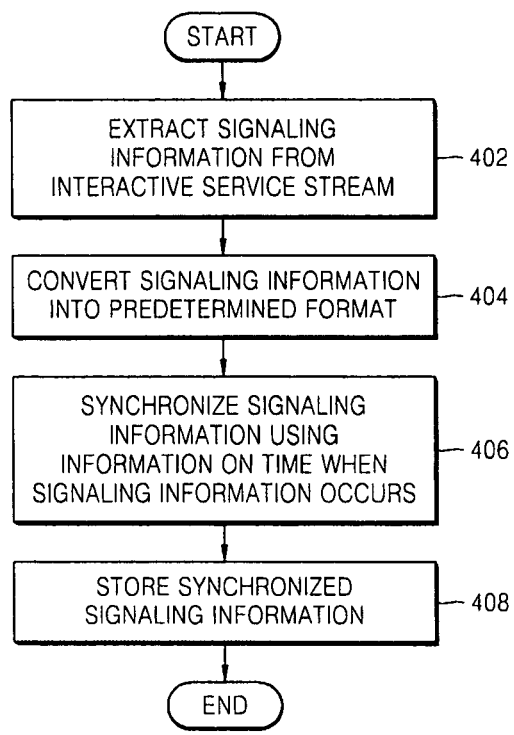
FIG. 4 is a flowchart illustrating a method of storing an interactive service according to an exemplary embodiment of the present invention.

FIG. 4 is a flowchart illustrating a method of storing an interactive service according to an exemplary embodiment of the present invention.

Referring to FIG. 4, signaling information is extracted from an interactive service stream through filtering and monitoring processes when the interactive service is stored (402). The extracted signaling information is converted into information in a predetermined format (404). At first, all signaling items are converted for each type of the signaling information, and thereafter when the same signaling information occurs, only a changed signaling information item may be converted. Here, a time information field of the signaling information is left vacant. Next, an occurrence time of the signaling information is calculated based on the NPT, etc. and recorded to synchronize the signaling information in a predetermined format for the signaling information that has occurred, and a process for the signaling information is completed (406). The converted and synchronized signaling information is stored in the storage unit 240 and used when the interactive service is reproduced.

Figure 5:
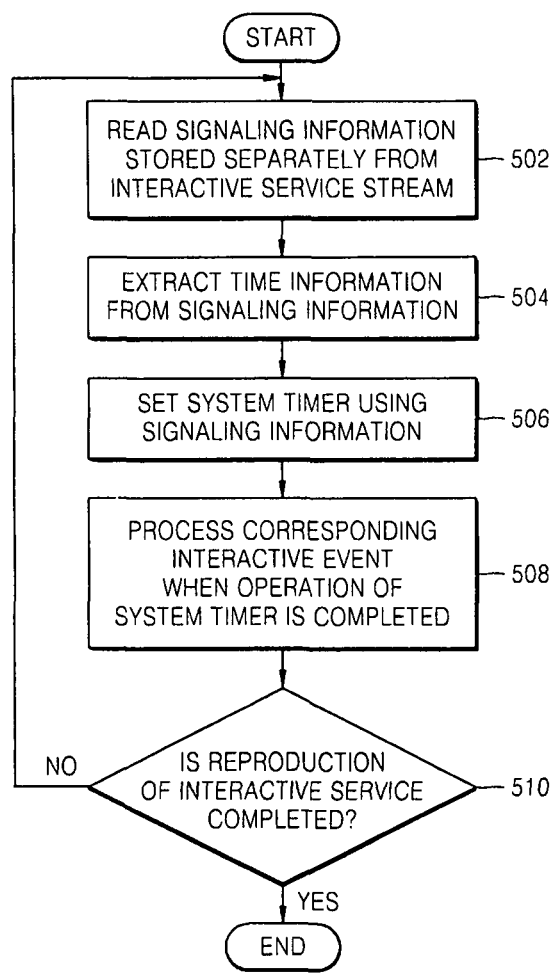
FIG. 5 is a flowchart illustrating a method of reproducing an interactive service according to an exemplary embodiment of the present invention.

FIG. 5 is a flowchart illustrating a method of reproducing an interactive service according to an exemplary embodiment of the present invention.

Referring to FIG. 5, at first, signaling information which is stored separately from an interactive service stream is read (502). At this time, time information is extracted from signaling information that has occurred first (504). A system timer is set using the extracted time information (506). When an operation of the system timer 506 is completed, the signaling information is processed in a same method as the signaling information is signaled from a broadcast stream at the set time. Accordingly, an appropriate process related to a corresponding interactive event is performed using the signaling information (508). It is checked whether the reproduction of the interactive service is completed (510). When the reproduction is completed, the process is terminated. On the other hand, when the reproduction of the interactive service is not completed, processes from the reading of the stored signaling information (502) are repeated. In other words, the time information for the next signaling information is extracted, the system timer is set, and a corresponding interactive event is processed when a timer interrupt occurs.

The invention can also be embodied as computer readable codes on a computer readable recording medium.

According to an exemplary embodiment of the present invention, signal filtering and monitoring using hardware or software to acquire interactive signaling information on a service stream for reproducing an interactive service is unnecessary because the signaling information is separately stored.

In addition, according to an exemplary embodiment of the present invention, signal filtering and monitoring using hardware or software to acquire interactive signaling information is replaced with a simple method of setting a timer, and accordingly an interactive event can be processed without incurring a heavy load.

In addition, according to an exemplary embodiment of the present invention, a storage space can be saved by storing only an item of the signaling information that has changed.

In addition, according to an exemplary embodiment of the present invention, a service requiring a history of signaling information such as a trick play can be easily provided.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A non-transitory information recording medium having recorded thereon interactive signaling information of a digital broadcast, the interactive signaling information comprising:
   a first region which stores information on a time when the interactive signaling information occurs;
   a second region which stores a type of the interactive signaling information and identification information; and a third region which stores signaling items of the interactive signaling information, wherein an apparatus for reproducing an interactive service of the digital broadcast uses the interactive signaling information stored on the information recording medium to process a corresponding interactive event at the time the interactive signaling information occurs, wherein the first region, the second region, and the third region are separate regions, and wherein the third region comprises:

only information on a signaling item that has changed, which is determined by comparing the interactive signaling information with the type of interactive signaling information that previously occurred, and identification information on the interactive signaling information that previously occurred.

2. The information recording medium of claim 1, wherein the first region comprises information on an occurrence time of the interactive signaling information based on at least one of an NPT (normal play time), a PCR/STC (program clock reference/system time clock), and a TDT/TOT (time and date table/time offset table).

3. An apparatus for storing an interactive service of a digital broadcast, said apparatus comprising:

a signaling information acquisition unit which extracts signaling information from an interactive service stream;

a signaling information conversion unit which converts the extracted signaling information into signaling information of a predetermined format;

a synchronization unit which generates information on an occurrence time of the extracted signaling information and adds the generated information on the occurrence time to the signaling information of the predetermined format; and a storage unit which stores the synchronized signaling information of the predetermined format, wherein the synchronized signaling information of the predetermined format comprises a first region including information on a time when the interactive signaling information occurs, a second region including a type of the interactive signaling information and identification information, and a third region including only changed signaling items of the interactive signaling information, wherein the first region, the second region, and the third region are separate regions, wherein the signaling information conversion unit compares the extracted signaling information to previously stored signaling information of the predetermined format and converts changed information only into the signaling information of the predetermined format, and wherein the signaling information conversion unit generates the signaling information of the predetermined format including all signaling items for each type of interactive signaling information when the type of the interactive signaling information occurs for a first time and generates the signaling information of the predetermined format including information on changed signaling items thereafter.

4. The apparatus of claim 3, wherein the first region comprises information on an occurrence time of the interactive signaling information based on at least one of an NPT (normal play time), a PCR/STC (program clock reference/system time clock), and a TDT/TOT (time and date table/time offset table).

5. An apparatus for reproducing an interactive service of a digital broadcast, the apparatus comprising:

a storage unit which stores synchronized signaling information of a predetermined format separately from an interactive service stream;

a retrieval unit which reads the stored signaling information and the interactive service stream; and a signaling information processing unit which, if the interactive service stream is reproduced, refers to the read signaling information and processes a corresponding interactive event at every occurrence time of the signaling information, wherein the stored signaling information comprises a first region including information on a time if the interactive signaling information occurs, a second region including a type of the interactive signaling information and identification information, and a third region including signaling items of the interactive signaling information, wherein the first region, the second region, and the third region are separate regions, and wherein the third region comprises:

only information on a signaling item that has changed, which is determined by comparing the interactive signaling information with the type of interactive signaling information that previously occurred, and identification information on the interactive signaling information that previously occurred.

6. The apparatus of claim 5, wherein the signaling information processing unit comprises:

a time information extraction unit which extracts information on a time when the signaling information occurs, from the read signaling information;

a timer setting unit which sets a system timer using the extracted time information; and an event handling unit which processes a corresponding interactive event using the read signaling information if an operation of the system timer is completed.

7. A method of storing an interactive service of a digital broadcast, the method comprising:

extracting signaling information from an interactive service stream;

converting the extracted signaling information into signaling information of a predetermined format;

synchronizing the extracted signaling information by generating information on a time when the extracted signaling information occurs and adding the information on the time to the signaling information of the predetermined format; and storing the synchronized signaling information of the predetermined format, wherein the synchronized signaling information of the predetermined format comprises a first region including information on a time if the interactive signaling information occurs, a second region including a type of the interactive signaling information and identification information, and a third region including only changed signaling items of the interactive signaling information, wherein the first region, the second region, and the third region are separate regions, wherein the converting of the extracted signaling information comprises comparing the extracted signaling information to previously stored signaling information of the predetermined format and converting only information that has changed into the signaling information of the predetermined format, and wherein the converting of only the information that has changed into the signaling information of the predetermined format comprises:

generating the signaling information of the predetermined format comprising information on all signaling items if a type of the interactive signaling information is stored for the first time, and generating the signaling information of the predetermined format comprising information on signaling items that have changed with respect to those of previously stored signaling information, if the type of the interactive signaling information is stored again.

8. The method of claim 7, wherein the synchronizing of the extracted signaling information comprises describing the information on a time when the extracted signaling information occurs based on at least one of an NPT (normal play time), a PCR/STC (program clock reference/system time clock), and a TDT/TOT (time and date table/time offset table).

9. A non-transitory computer-readable recording medium having embodied thereon a computer program for a method of storing an interactive service of a digital broadcast, the method comprising:

extracting signaling information from an interactive service stream;

converting the extracted signaling information into signaling information of a predetermined format;

synchronizing the extracted signaling information by generating information on a time when the extracted signaling information occurs and adding the information on the time to the signaling information of the predetermined format; and storing the synchronized signaling information of the predetermined format, wherein the synchronized signaling information of the predetermined format comprises a first region including information on a time if the interactive signaling information occurs, a second region including a type of the interactive signaling information and identification information, and a third region including only changed signaling items of the interactive signaling information, wherein the first region, the second region, and the third region are separate regions, and wherein the converting of the extracted signaling information comprises comparing the extracted signaling information to previously stored signaling information of the predetermined format and converting only information that has changed into the signaling information of the predetermined format, and wherein the converting of only the information that has changed into the signaling information of the predetermined format comprises:

generating the signaling information of the predetermined format comprising information on all signaling items if a type of the interactive signaling information is stored for the first time, and generating the signaling information of the predetermined format comprising information on signaling items that have changed with respect to those of previously stored signaling information, if the type of the interactive signaling information is stored again.

10. A method of reproducing an interactive service of a digital broadcast, the method comprising:

reading signaling information which is stored separately from an interactive service stream; and if the interactive service stream is reproduced, processing the read signaling information by referring to the read signaling information and processing a corresponding interactive event at every occurrence time of the signaling information, wherein the stored signaling information comprises a first region including information on a time if the interactive signaling information occurs, a second region including a type of the interactive signaling information and identification information, and a third region including signaling items of the interactive signaling information, wherein the first region, the second region, and the third region are separate regions, and wherein the third region comprises:

only information on a signaling item that has changed, which is determined by comparing the interactive signaling information with the type of interactive signaling information that previously occurred, and identification information on the interactive signaling information that previously occurred.

11. The method of claim 10, wherein the processing of the signaling information comprises:

extracting information on a time when the signaling information occurs, from the read signaling information;

setting a system timer using the extracted time information; and processing a corresponding interactive event using the read signaling information if an operation of the set system timer is completed.

12. A non-transitory computer-readable recording medium having embodied thereon a computer program for a method of reproducing an interactive service of a digital broadcast, the method comprising:

reading synchronized signaling information of a predetermined format which is stored separately from an interactive service stream;

if reproducing an interactive service stream, extracting information on a time when the signaling information occurs, from the read signaling information;

setting a system timer using the extracted time information; and processing a corresponding interactive event using the read signaling information if an operation of the set system timer is completed, wherein the stored signaling information comprises a first region including information on a time if the interactive signaling information occurs, a second region including a type of the interactive signaling information and identification information, and a third region including signaling items of the interactive signaling information, wherein the first region, the second region, and the third region are separate regions, and wherein the third region comprises:

only information on a signaling item that has changed, which is determined by comparing the interactive signaling information with the type of interactive signaling information that previously occurred, and identification information on the interactive signaling information that previously occurred.

* * * * *